United States Patent
Spata

(10) Patent No.: US 8,818,705 B2
(45) Date of Patent: Aug. 26, 2014

(54) CAPTURING ENVIRONMENTAL INFORMATION

(75) Inventor: Gregory P. Spata, West Chester, OH (US)

(73) Assignee: Accenture Global Services Limited, Dublin (IE)

(*) Notice: Subject to any disclaimer, the term of this patent is extended or adjusted under 35 U.S.C. 154(b) by 123 days.

(21) Appl. No.: 13/451,922

(22) Filed: Apr. 20, 2012

(65) Prior Publication Data

US 2012/0271491 A1    Oct. 25, 2012

Related U.S. Application Data

(63) Continuation of application No. 13/222,230, filed on Aug. 31, 2011.

(60) Provisional application No. 61/477,377, filed on Apr. 20, 2011.

(51) Int. Cl.
*G01C 21/00* (2006.01)

(52) U.S. Cl.
USPC ............... 701/408; 701/3; 701/10; 701/300; 701/514

(58) Field of Classification Search
USPC .............. 701/2, 3, 4, 10, 408, 300, 514; 455/456.5
See application file for complete search history.

(56) References Cited

U.S. PATENT DOCUMENTS

| | | | |
|---|---|---|---|
| 5,455,409 A | 10/1995 | Smith et al. | |
| 7,532,119 B2 | 5/2009 | Bratkovski et al. | |
| 7,642,914 B2 | 1/2010 | Campbell et al. | |
| 7,725,212 B2 | 5/2010 | Prasse | |
| 8,010,133 B2 * | 8/2011 | Cheok et al. | 455/456.5 |
| 8,521,418 B2 * | 8/2013 | Ma et al. | 701/408 |
| 8,554,478 B2 * | 10/2013 | Hartman | 701/514 |
| 2006/0171538 A1 | 8/2006 | Larson et al. | |
| 2007/0284474 A1 | 12/2007 | Olson et al. | |
| 2008/0144884 A1 | 6/2008 | Habibi | |
| 2012/0089233 A1 * | 4/2012 | Capon et al. | 623/19.13 |

FOREIGN PATENT DOCUMENTS

JP    2000 147085    5/2011

OTHER PUBLICATIONS

Extended European Search Report dated Mar. 15, 2013 from related European Application No. 12002777.6, 9 pages.
Purohit et al., "SensorFly: Controlled-mobile sensing platform for indoor emergency response applications," Information Processing in Sensor Networks (IPSN), 2011 10th International Conference on Apr. 12, 2011, pp. 223-234.

(Continued)

*Primary Examiner* — Gertrude Arthur Jeanglaude
(74) *Attorney, Agent, or Firm* — Fish & Richardson P.C.

(57) ABSTRACT

In general, a method performed on a vehicle includes determining that the vehicle is located within a predetermined range of a beacon, the beacon being associated with a beacon identification, navigating the vehicle to a first location based on determining that the vehicle is located with the predetermined range, generating a first report based on determining that the vehicle is located at the first location, the generating including: specifying the beacon identification, recording navigation data that includes an altitude, a distance from the beacon, and a bearing relative to the beacon, and recording environmental data. The method further includes transmitting the first report from the vehicle to a base station, the first report including the beacon identification, the navigation data, and the environmental data.

24 Claims, 11 Drawing Sheets

(56) References Cited

OTHER PUBLICATIONS

Min, et al. "Development of a Micro Quad-Rotor UAV for Monitoring an Indoor Environment", Proceedings of the FIRA RoboWorld Congress 2009 on Advances in Robotics, 2009, pp. 262-271.

Nagai, et al. "UAV-Based Sensor Web Monitoring System", 2012, Dowloaded from the internet at http://www.hindawi.com/journals/ijno/2012/858792/ on Jul. 20, 2012, 7 pages.

U.S. Non-Final Office Action for U.S. Appl. No. 13/222,230 dated Jan. 16, 2014, 25 pages.

\* cited by examiner

CAPTURING ENVIRONMENTAL INFORMATION

CROSS-REFERENCE TO RELATED APPLICATIONS

This patent application is a continuation of U.S. patent application Ser. No. 13/222,230, filed Aug. 31, 2011, which claims the benefit of U.S. Provisional Patent Application No. 61/477,377, filed Apr. 20, 2011, the contents of both of which are incorporated by reference.

TECHNICAL FIELD

This specification relates to capturing environmental information.

BACKGROUND

It is often useful to monitor the environmental characteristics of certain settings. Data centers (e.g., a room containing a number of machines, such as, for example, servers, network devices and storage devices) are an example of a setting in which it is important to monitor environmental characteristics. For example, while under load, data center equipment can generate a significant amount of heat, and increasing the power density of a system can result in an increase in the number of heat concentration pockets. Combinations of air and liquid cooling solutions and monitoring techniques can be used to manage the environmental characteristics of a setting such as a data center.

SUMMARY

In general, one aspect of the subject matter described in this specification may be embodied in methods for monitoring environmental conditions (e.g., temperature, noise, pressure and humidity) within a setting such as a data center. In some examples, the environmental conditions are monitored by an unmanned aerial vehicle (UAV) that includes a number of sensors that are used to both navigate the UAV and to record information representative of environmental conditions of the environment in which the UAV is operating. The environmental information recorded by the UAV can be used to locate areas of concern in a data center, such as, for example, areas or pockets of abnormally high heat or humidity. The environmental information can also be used to generate histograms of the conditions within the monitored environment and provide information needed for data center managers to take remedial action.

In general, one innovative aspect of the subject matter described in this specification may be embodied in a method performed on a vehicle that includes determining that the vehicle is located within a predetermined range of a beacon, the beacon being associated with a beacon identification, navigating the vehicle to a first location based on determining that the vehicle is located with the predetermined range, generating a first report based on determining that the vehicle is located at the first location, the generating including: specifying the beacon identification, recording navigation data that includes an altitude, a distance from the beacon, and a bearing relative to the beacon, and recording environmental data. The method further includes transmitting the first report from the vehicle to a base station, the first report including the beacon identification, the navigation data, and the environmental data.

In general, in another aspect, a method performed on a vehicle includes determining that the vehicle is located within a predetermined range of a beacon, the beacon being associated with a beacon identification, generating a first report based on determining that the vehicle is located within a predetermined range of the beacon, the generating including: specifying the beacon identification, recording navigation data that includes an altitude, a distance from the beacon, and a bearing relative to the beacon, and recording environmental data. The method further includes transmitting the first report from the vehicle to a base station, the first report including the beacon identification, the navigation data, and the environmental data.

In general, in another aspect, a method performed on a vehicle includes determining that the vehicle is located within a predetermined range of a beacon, the beacon being associated with a beacon identification, navigating the vehicle to a first location based on determining that the vehicle is located with the predetermined range, generating a first report based on determining that the vehicle is located at the first location, the first report including the beacon identification, navigation data that includes an altitude, a distance from the beacon, and a bearing relative to the beacon, and environmental data.

In general, in another aspect, a method performed on a vehicle includes navigating a vehicle toward a beacon based on a first signal associated with a first protocol, the beacon being associated with a beacon identification, receiving a second signal associated with a second protocol, navigating the vehicle toward a first location based at least in part on the second signal, determining, that the vehicle is located within a predetermined range of the first location based on the second signal, and generating a first report based on determining that the vehicle is located within the predetermined range, the first report including the beacon identification, navigation data that includes an altitude, a distance from the beacon, and a bearing relative to the beacon, and environmental data.

In general, in another aspect, a vehicle includes one or more first sensors configured to provide location information associated with a location of the vehicle, one or more second sensors configured to provide environmental data, and one or more memory devices and one or more processing devices in communication with the one or more first sensors and the one or more second sensors, the one or more memory devices and the one or more processing devices being configured to: determine that the vehicle is located within a predetermined range of a beacon based on the location information, the beacon being associated with a beacon identification, navigate the vehicle to a first location based on determining that the vehicle is located with the predetermined range, and generate, based on the environmental data, a first report based on determining that the vehicle is located at the first location, the first report including the beacon identification, navigation data that includes an altitude, a distance from the beacon, and a bearing relative to the beacon, and environmental data.

These and other aspects may include one or more of the following features. Navigating the vehicle to the first location may include navigating the vehicle according to a predetermined pattern of movement, or may include avoiding obstacles based on data provided by one or more obstacle sensors associated with the vehicle.

The one or more obstacle sensors may include one or more of an ultrasonic sensor, an infrared sensor, a camera, an altimeter, and one or more contact switches. The beacon identification broadcasted by the beacon may be received. Recording the environmental data may include measuring one or more of a temperature and a level of humidity of the first location.

The vehicle may be navigated to one or more subsequent locations, and respective reports may be generated for the subsequent locations. Generating the first report may include activating one or more sensors. The one or more sensors may include one or more of an altimeter, a compass, a temperature sensor, a humidity sensor, and a radio-frequency identification (RFID) sensor.

The vehicle may include a rotary wing aerial vehicle, particularly a quad-rotor aerial vehicle. The vehicle may be an unmanned aerial vehicle (UAV).

Environmental qualities of one or more locations within a data center may be determined based at least in part on the first report. An initial report may be generated based on determining that the vehicle is located within a predetermined range of the beacon. The initial report may be transmitted from the vehicle to a base station prior to navigating the vehicle to the first location, the initial report including the beacon identification, the navigation data, and the environmental data. Generating the initial report may include specifying the beacon identification; recording navigation data that includes an altitude, a distance from the beacon, and a bearing relative to the beacon; and recording environmental data.

Visual data may be captured using one or more cameras associated with the vehicle. The visual data may include one or more of an image or a video. The visual data may be captured based on based on a determination that one or more events has occurred. The determination may include determining that at least a portion of the environmental data exceeds or falls below a predetermined threshold.

Other embodiments of these aspects include corresponding systems, apparatus, and computer programs, configured to perform the actions of the methods, encoded on computer storage devices.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
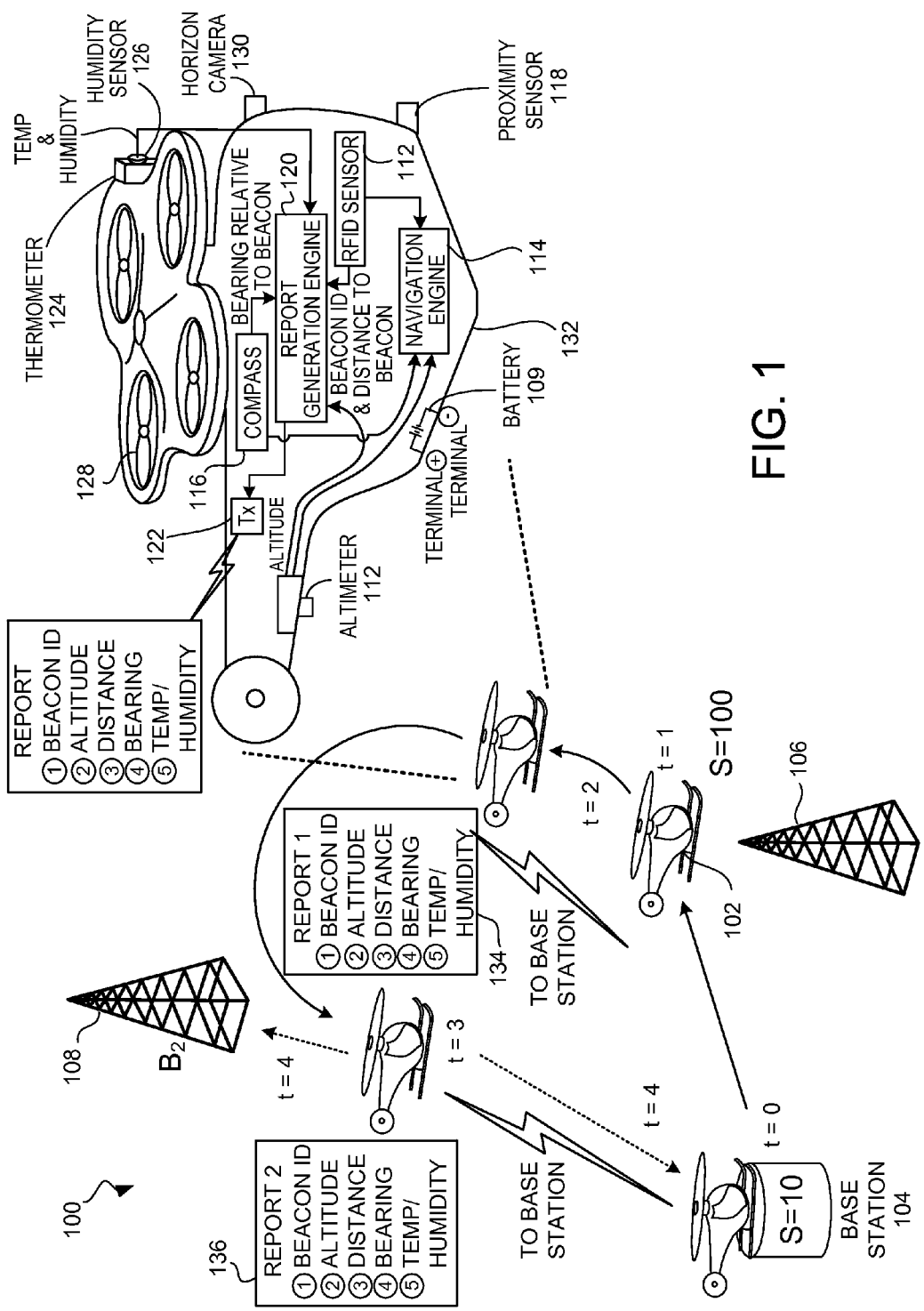
FIG. 1 is a diagram of a system for capturing environmental information.

FIG. 1 shows a system 100 in which a vehicle patrols an area to monitor environmental conditions of the area. In the example of FIG. 1, the vehicle is a UAV 102 and, specifically, is a self-charging quad-rotor UAV. In general, the system 100 monitors environmental conditions such as temperature, noise, pressure, and humidity, within a setting such as a data center. In some examples, the UAV 102 includes a number of sensors that are used to both navigate the UAV 102 and to record environmental information representative of environmental conditions of the environment in which the UAV 102 is operating.

The environmental information recorded by the UAV 102 can be used to locate areas of concern in a data center, such as areas or pockets of abnormally high heat, noise or humidity. The environmental information can also be used to generate visual representations, such as histograms, of the environmental conditions within the monitored environment. For example, the environmental information recorded by the UAV 102 can be used to generate data representations (e.g., graphs and spreadsheets) that reflect a time history of the monitored environmental conditions.

Patterns can be detected in these data representations to automatically determine, for example, whether any corrective actions need to be taken. For example, if the environmental information shows that a particular location or locations within a monitored data center is abnormally hot during a particular time period each day (e.g., 9:30 AM on Mondays, when the machine might be under a heavy load), an administrator or an engine could choose to take extra temperature control measures during that time such as, for example, moving some equipment to another location to distribute the heat generation, or adjusting the airflow vents in the area to better cool the environment. Such patterns may be represented visually by a graph or chart.

The UAV 102 includes a combination of hardware and software to both navigate the UAV 102 and to acquire and transmit environmental information to a central location (e.g., the base station 104). For example, the UAV 102 includes one or more environmental sensors, such as a thermometer 124 and a humidity sensor 126. These sensors are located in positions that will not be affected by the operation of the rotors 128 (e.g., above the rotors 128 or in front of a frame that supports the rotors, as shown).

The UAV 102 also includes navigational features, such as an altimeter 112, a radio-frequency identification (RFID) sensor 110, a compass 116 (e.g., an electronic compass), and a proximity sensor 118. The compass 116 provides a heading or bearing of the UAV 102 (e.g., by providing information that allows a relative bearing to be calculated) and can be an analog or digital compass. The altimeter 112 provides an altitude of the UAV 102, and can be implemented as a downward-facing infrared altimeter or an ultrasonic altimeter. The proximity sensor 118 provides collision detection functionality using infrared or ultrasonic obstacle detection techniques.

Additional proximity sensors can be located on the UAV 102 to provide an increased range of coverage for detecting collisions and obstacles. The UAV 102 may also include a horizon detection device 130 (e.g., a camera) for stabilizing and properly orienting the UAV 102. The RFID sensor provides a position of the UAV 102 relative to one or more beacons (e.g., the first beacon 106), as described in further detail below. The navigational features communicate with a navigation engine 114 to navigate the UAV 102. In some examples, the navigation engine 114 is an application running on a processing device associated with the UAV 102, and uses values provided by the navigational features to navigate the UAV 102. In some embodiments, the processing device may be on board UAV 102 and thus the navigation is performed locally. In alternative embodiments, the processing device may be located remotely from UAV 102. In such cases, UAV 102 may send sensor data to the processing device wirelessly and may receive navigation information from the processing device also wirelessly.

The UAV 102 also includes a report generation engine 120. In some examples, the report generation engine 120 generates reports (e.g., report 134) that provide the environmental conditions of a particular location. The report generation engine 120 uses data provided by the altimeter 112, the RFID sensor 110, the thermometer 124, the humidity sensor 126, and the compass 116 to generate reports that are transmitted to a central location using a transmission device 122. In some examples, the transmission device 122 transmits reports using one or more wireless transmission protocols, such as WiFi, Bluetooth, radio communication, and the like. An example of a protocol that can be used is XBee wireless communication protocol (IEEE 802.15.4) which uses low power radio frequency at 2.4 GHz.

In some examples, the system 100 includes a first beacon 106 and a second beacon 108. The number of beacons included a system can depend on the range of the beacon and the size of the environment being monitored. The first and second beacons 106, 108 are configured to transmit respective pilot signals that can be detected by sensors (e.g., an RFID sensor 110) on the UAV 102. The UAV 102 uses the pilot signals transmitted by the first and second beacons 106, 108 to navigate to various locations within a monitored environment. The first and second beacons 106, 108 can be placed at locations within a monitored environment to act as waypoints for the UAV 102. Each of the first and second beacons 106, 108 also transmits a Beacon ID that uniquely identifies its associated beacon.

In some examples, the UAV 102 remains docked at a base station 104 until a monitoring session is triggered, either by a user or as part of a predefined schedule. Thus, in an initial state (referred to as "time zero," or "t=0"), the UAV is docked at the base station 104. While the UAV 102 is docked at the base station 104, a battery 109 associated with the UAV 102 may be charged by a charging device (FIG. 3) located in the base station 104. Terminals of the battery 109 can be located in a base 132 of the UAV 102.

While the UAV 102 is docked at the base station 104 at t=0, a monitoring session can be initiated which activates the UAV 102 (e.g., powers on the UAV 102 from an OFF or "sleep" state). Based on a triggering event, the UAV 102 powers up, executes one or more self-test procedures, and begins to navigate according to a flight plan that can be stored locally on the UAV 102 or at a remote control station (e.g., the base station 104 or a separate entity) and transmitted to the UAV 102 before or during the monitoring session.

If the flight plan specifies that the UAV 102 will first travel toward the first beacon 106, the UAV 102 attempts to detect a pilot signal associated with the first beacon 106 using an onboard RFID sensor 110. In this example, at t=0 the UAV 102 detects a pilot signal associated with the first beacon 106 and determines the signal strength of that pilot signal. The signal strength can be measured in decibels (dB) or as dBm or dBmW (a power ratio in decibels of the measured power referenced to one milliwatt (mW)).

At t=0, the UAV determines that the signal strength of the pilot signal associated with the first beacon 106 is 10 dB. In order to navigate to the first beacon 106, the UAV 102 may determine that it must navigate to a position at which the pilot signal for the first beacon 106 is measured at 100 dB. Accordingly, the UAV 102 navigates while simultaneously monitoring for an increase in signal strength of the pilot signal associated with the first beacon 106. In some examples, the UAV has access to an initial heading or bearing when departing the base station 104.

At t=1, the UAV 102 has navigated to a location adjacent to (e.g., directly above) the first beacon 106. At this position, the UAV 102 measures the strength of the first beacon's pilot signal to be 100 dB. The UAV 102 can determine that it is located at the first beacon 106 by comparing the measured pilot signal strength to a list which compares distance and signal strength value, or by using one or more algorithms to convert the measured pilot signal strength into a distance. In order to navigate to a position directly above the first beacon 106, the UAV 102 can use the altimeter 112 to ensure that its altitude is greater than a known altitude of the first beacon 106. In some examples, if the RFID beacon is mounted to a ceiling of the monitored environment, the UAV 102 may navigate to a position directly underneath the beacon. In some examples, obstacle avoidance can be utilized during navigation without a need for pre-programmed signal altitudes.

Once the UAV 102 determines that it is located in an appropriate position, it may initiate a monitoring pass. In some examples, a monitoring pass refers to a predetermined pattern of movement undertaken by the UAV 102 upon reaching a location (e.g., upon navigating to a position above the first beacon 106). For example, initiating a monitoring pass could cause the UAV 102 to navigate in a pattern of movement that resembles a cyclone by causing the UAV 102 to navigate downward in a slowly descending spiral of movement, taking periodic measurements (e.g., every two seconds) along the way. In some examples, the UAV 102 can initiate a flight path that resembles a horizontal spiral while maintaining a constant altitude. The UAV 102 can take periodic measurements while traveling along this flight path and, once the spiral has been completed, the UAV 102 can move to a different altitude and can begin a second horizontal spiral flight path.

During the monitoring pass, the UAV 102 can periodically measure environmental information using the thermometer 125, the humidity sensor 126, and or any other sensor. For example, at t=2, the UAV 102 has initiated a monitoring pass and has reached a first monitoring pass position.

After reaching the first monitoring pass position, the UAV 102 generates the report 132, and transmits the report 134 to the base station 104. In some examples, the report 132 includes the beacon ID (e.g., a beacon ID associated with the first beacon 106); an altitude of the UAV 102; a distance from the beacon identified by the recorded beacon ID; a bearing of the UAV 102 relative to the beacon identified by the recorded beacon ID; and any recorded environmental information (e.g., one or more temperature and/or humidity measurements). The report 132, 134, and/or 136 can be a batch of reports. For example, the UAV 102 may generate a batch of reports at each beacon. The batches of reports can be combined into fewer reports, such as a single report.

The UAV 102 may also generate and transmit a similar report before initiating a monitoring pass, such as upon determining that the UAV 102 is within a predetermined range of the first beacon 106. After generating the report 134, the UAV 102 continues to a second monitoring pass position at t=3, where it generates a second report 136.

The first and second monitoring pass positions do not need to be predefined positions, and can instead be defined by the location of the UAV 102 after navigating according to a predetermined patter of flight, or after the UAV 102 has navigated for a predefined amount of time. After generating and transmitting the second report 136, at t=4 the UAV 102 can navigate to the second beacon 108, can continue to a third monitoring pass position for the first beacon 106, or can return to dock at the base station 104 for recharging.

Figure 3:
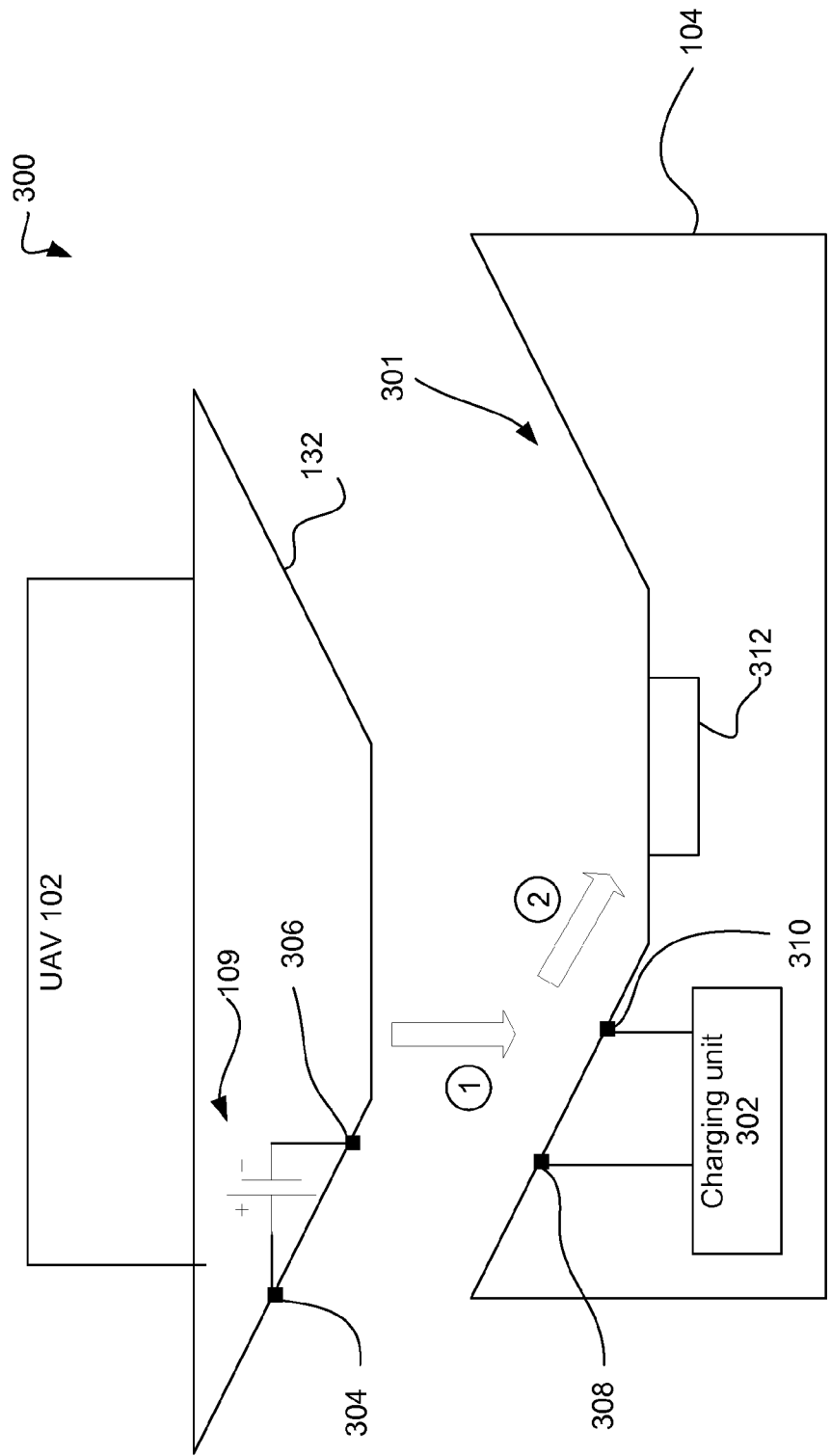
FIG. 3 is a diagram of a base station.

As shown in FIG. 3, the UAV 102 can be configured to dock with the base station in such a way that terminals on its battery are aligned with charging terminals associated with the base station 104. In some examples, the UAV 102 can use a pilot signal transmitted by the base station 104 to hone in on the base station 104 in the same way that it locates and navigates to the beacons.

Figure 2:
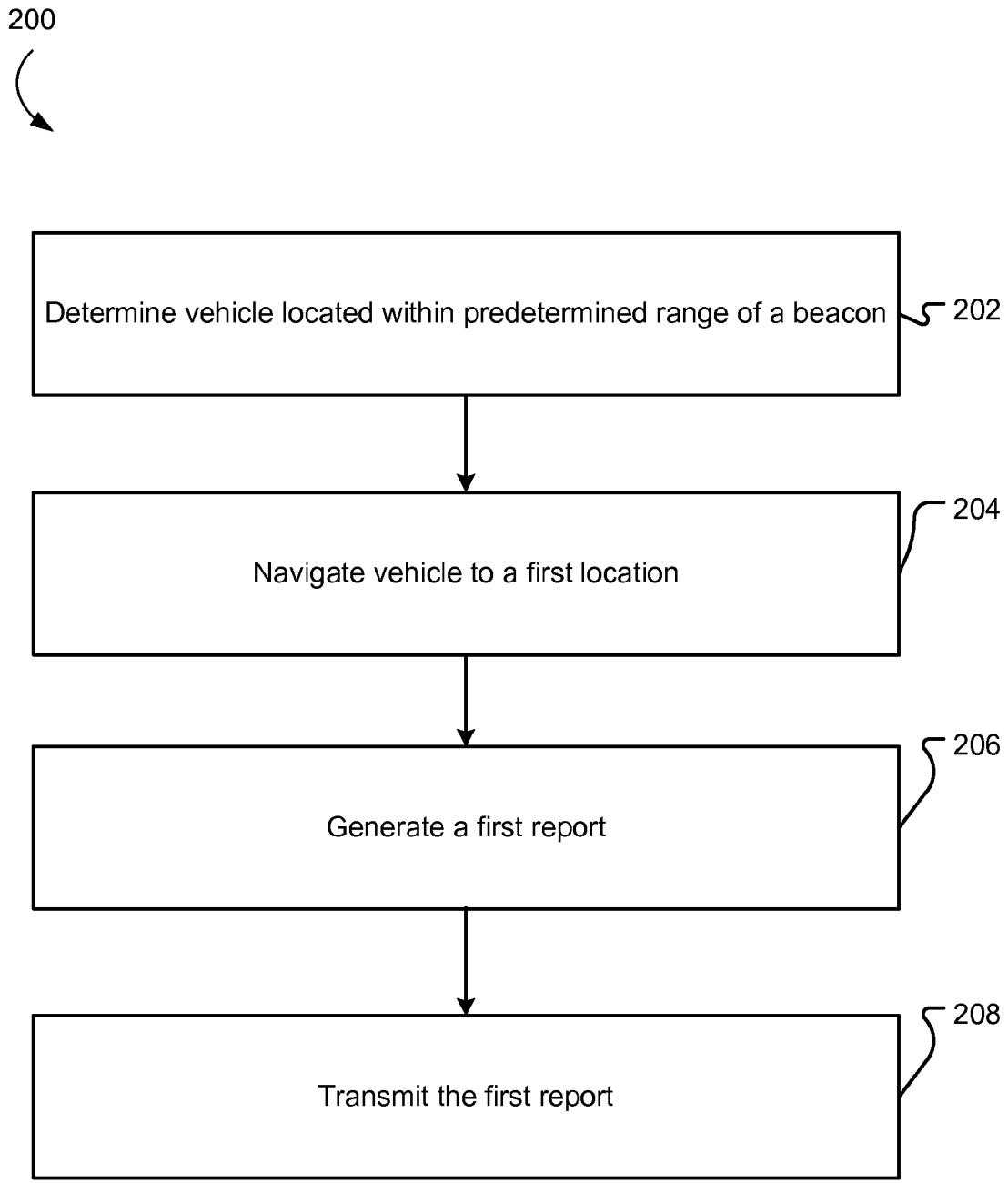
FIG. 2 is a flow chart of a process for capturing environmental information.

FIG. 2 shows a process 200 for collecting environmental information using a vehicle. A vehicle determines that the vehicle is located within a predetermined range of a beacon (202). For example, the UAV 102 can use a pilot signal strength transmitted by a beacon to determine its proximity to the beacon. The UAV 102 can be configured to navigate to a position within a threshold distance from the beacon, such as a position directly above the beacon, or a position several feet away from the beacon.

The UAV 102 is configured to travel to a first beacon based on a predefined navigational plan that specifies an order in which the beacons should be visited. The beacons can be referenced by their unique beacon IDs in the navigational plan and may, for example, instruct the UAV 102 to "navigate to beacon 1" as a first waypoint. The pilot signal broadcast by each beacon indicates the beacon ID of its source beacon so that the UAV 102 is able to associate the pilot signal strength with a specific beacon. The UAV 102 may receive more than one pilot signal at a time, as the broadcast cells of multiple beacons may overlap.

The vehicle is navigated to a first location based on determining that the vehicle is located with the predetermined range (204). For example, upon determining that the UAV 102 is located directly above the beacon, the UAV 102 begins a monitoring pass and navigates to a first monitoring pass position. The first monitoring pass position is defined by a distance from and a bearing relative to the beacon.

While navigating, the UAV 102 avoids obstacles using the proximity sensor 118. In some examples, the proximity sensor is an infrared or ultrasonic sensor that emits infrared or ultrasonic energy and then detects energy reflected from various surfaces proximal to the UAV 102. The UAV 102 can use the proximity sensor 118 to evade obstacles such as, for example, machine racks in a data center, people working in the data center, and/or other UAVs.

While in some examples the monitoring pass is defined by a predefined pattern of movement that endeavors to avoid known obstacles in the monitored environment, the proximity sensor 118 can further ensure that the UAV 102 is able to navigate safely. The proximity sensor 118 also ensures that the UAV 102 can detect dynamic obstacles that may have been introduced after the creation of the monitoring pass pattern of movement (e.g., if a new piece of equipment is added to a data center).

A first report is generated based on determining that the vehicle is located at the first location (206). For example, upon reaching the first monitoring pass position, the UAV 102 generates a report using the report generation engine 120. In some examples, generating the report includes specifying the beacon identification, recording navigation data that includes an altitude, a distance from the beacon, and a bearing relative to the beacon, and recording environmental information.

The navigation data can be determined using a combination of the altimeter 112, the compass 116, and the RFID sensor 110. One or more processing devices and/or applications associated with the UAV 102 may process some of the raw data obtained from the altimeter 112, the compass 116, and the RFID sensor 110 in order to provide the desired values. For example, a processing device may convert a pilot signal strength in decibels detected by the RFID sensor 110 into a distance in feet or meters. While in some examples the UAV 102 generates a first report after determining that a first location has been reached, the UAV 102 may also generate and transmit a similar report before initiating a monitoring pass, such as upon determining that the UAV 102 is within a predetermined range of the first beacon 106.

In some examples, the UAV 102 records environmental information using one or more of the thermometer 124, the humidity sensor 126, and any other sensors that can be used to detect environmental conditions. Again, one or more processing devices and/or applications associated with the UAV 102 may process some of the raw data obtained from the environmental sensors (e.g., the humidity sensor 126) in order to provide the desired values.

The UAV 102 can be configured to re-measure environmental conditions that are determined to be abnormal. For example, if a measured environmental condition appears to be in error (e.g., a value that is unattainable) or is determined to lie be outside of a normal range (e.g., a temperature that is higher than an average or higher than a desirable data center temperature), the UAV 102 can automatically re-measure the environmental conditions. The report data can be uploaded to a computer that stores the data in a database or file for future use.

The first report is transmitted from the vehicle to a base station (208). For example, the UAV 102 can use the transmission device 122 to transmit the generated report to the base station 104 or to a second, different receiving station. In some examples, the first report includes the beacon identification (e.g., "beacon 1"), the navigation data (e.g., an altitude of the UAV 102, a distance of the UAV 102 from the beacon, and a bearing of the UAV 102 relative to the beacon), and the environmental information (e.g., a temperature and a level of humidity).

While in some examples a report is transmitted as a single packet (or as a single file transmitted as multiple packets) after all the data is gathered and organized into the report, the data can also be transmitted dynamically. For example, instead delaying transmission until the beacon ID, the navigation data, and the environmental information have been acquired, the UAV 102 can also transmit any or all of the data in a piecemeal fashion (e.g., the data can be transmitted as it is received).

Furthermore, in some examples, the UAV 102 can delay transferring the data to a central entity (e.g., the base station 104) until monitoring has been completed for a single beacon, for multiple beacons, or for the entire monitored environment. For example, the UAV 102 could store the data and/or the generated report onboard and could transfer the same to a central entity upon docking at the base station 104. The UAV 102 could also be configured to only transmit reports if any environmental conditions are abnormal, as described above.

After transmitting the first report, the UAV 102 can take one or more subsequent actions. For example, the UAV 102 can move on to a second monitoring pass position to generate a second report for the same beacon. The UAV 102 could also navigate to a second beacon (e.g., second beacon 108) and begin monitoring environmental conditions in the vicinity of the second beacon. Furthermore, if all monitoring passes have been completed or if the UAV 102 is recalled, the UAV 102 can return to dock and recharge at the base station 104. In some examples, the UAV 102 may monitor read its battery capacity (e.g., periodically, after the generation of one or more reports, after visiting one or more beacons, etc). The UAV 102 may choose to abort further activity and return to base to charge depending on the remaining capacity in its battery.

FIG. 3 shows a system 300 that includes the UAV 102 and the base station 104. This example illustrates how the base station 104 and the UAV 102 can utilize a gravity-assisted design to dock the UAV 102 at the base station 104. In some examples, the UAV 102 includes a base portion 132 that is shaped to mate with a cavity 301 defined by a body of the base station 104, even if the UAV 102 fails to land without precisely aligning itself with the cavity 301.

The base portion 132 of the UAV 102 is shaped to allow the base portion 132 of the UAV 102 to slide into alignment with the cavity 301 of the base station 104. For example, because the edges of the base portion 132 and the housing that defines the cavity 301 are sloped, if the UAV 102 lands in a position that is slightly off-center (shown as position "1" in FIG. 3), the UAV 102 will slide into the cavity 301 until coming to rest in a centrally-aligned position (shown as position "2" in FIG. 3).

Ensuring that the base portion 132 ultimately aligns with the cavity 301 allows the battery 109 of the UAV 102 to be charged by a charging unit 302 associated with the base station 104. Because the UAV 102 is meant to operate without assistance from a human operator in some instances, the gravity-assisted landing techniques shown in FIG. 3 can reduce the instances in which the UAV 102 is called upon to perform environmental monitoring but is unable to perform due to a depleted battery.

If the UAV 102 is properly docked at the base station 104, positive and negative terminals 304, 306 of the battery 109 will be aligned with (and will be in electrical communication with) positive and negative terminals 308, 310 of the charging unit 302. In some examples, the positive and negative terminals 308, 310 of the base station 104 are shaped in a ring, such that the base portion 132 of the UAV 102 can dock at the base station 104 without regard to its rotation relative to the base station. That is, because the terminals 308, 310 are rings that surround a substantial portion (or the entire portion) of the cavity 301, the terminals 304, 306 of the battery 109 may contact the terminals 308, 310 of the base station 104 regardless of the degree of rotation of the base portion 312 relative to the base station 104. Furthermore, this concentric ring terminal contact design may help prevent accidentally inverting the positive and negative terminals which could cause harm to the battery 109, the UAV 102 and/or the base station 104.

The charging unit 302 can be configured to begin charging the battery 109 upon sensing that an electrical connection has been completed between the battery 109 and the charging unit 302. The charging unit 302 may also reduce the amount of electrical current provided to the battery 109 as the battery 109 reaches various levels of charge, and may cease providing current to the battery 109 entirely when the battery reaches a fully-charged state. The charging unit 302 can also be configured to provide a "trickle charge" to the battery 109 if, for example, the battery 109 is to be maintained in a fully charged state for an extended period of time.

The base station 104 can also be configured to instruct the UAV 102 to take off and re-attempt docking with the base station 104 if no electrical connection between the battery 109 and the charging unit 302 can be established (e.g., if the UAV 102 lands so poorly that even the gravity-assisted design cannot properly align the terminals 304, 306 with the terminals 308, 310). In the event that the UAV 102 is unable to return to the base station 104 on its own, the UAV 102 may transmit a request to an operator for manual intervention.

The base station 104 also includes a broadcasting unit 312 for broadcasting the RFID pilot signal used by the UAV 102 to navigate throughout the monitored environment. In some examples, the broadcasting unit 312 is an omnidirectional transmitter that is configured to broadcast the base station's pilot signal on a specified frequency and/or channel. The pilot signal includes an identity of the base station 104 or beacon (e.g., "beacon 0"). Other beacons may include similar broadcasting units.

While the vehicle has been described as a UAV such as a quad-rotor rotary wing aircraft, the techniques described above could be implemented on a variety of other vehicles. For example, one or more track-guided vehicles could be used to measure environmental conditions using techniques similar to those described above.

Figure 4:
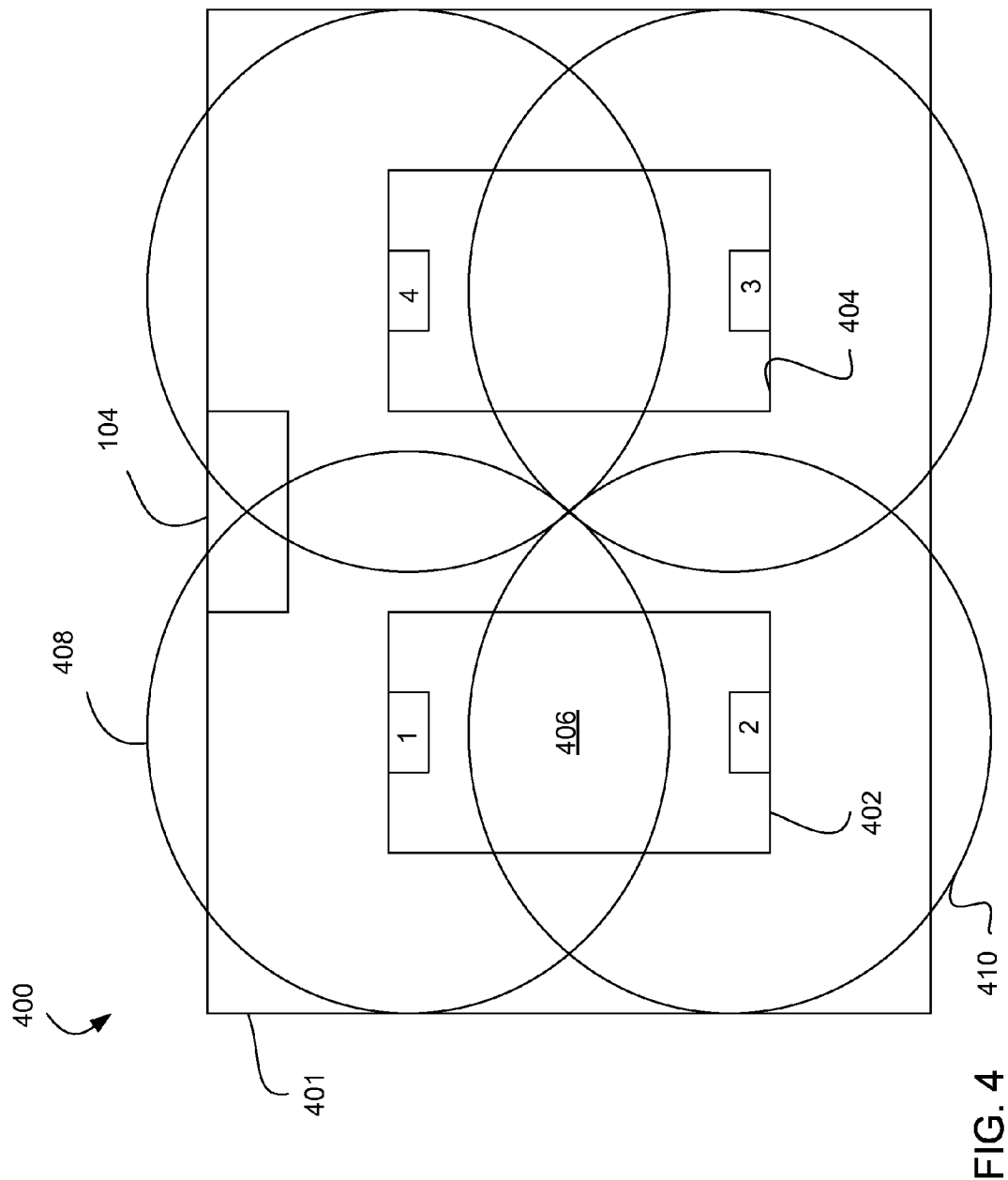
FIG. 4 is a diagram of data center.

FIG. 4 shows a possible test environment 400 which, in this example, is a data center 401. The data center includes a first row of machines (e.g., racks of equipment, free-standing equipment, etc.) 402 and a second row of machines 404. The environmental conditions in the data center 401 are monitored using the techniques described above. For example, four beacons (beacons 1, 2, 3, and 4) are located at various points within the data center 401 (e.g., at the ends of the first row of machines 402 and the ends of the second row of machines 404).

Each beacon has a respective coverage cell in which its pilot signal is broadcasted. For example, beacon 1 has a coverage cell 408 and beacon 2 has a coverage cell 410. The coverage cells can be increased or decreased by increasing or decreasing the transmission power for the pilot signals, respectively.

The coverage cells 408, 410 also define shared coverage areas 406. For example, the first coverage cell 408 overlaps the second coverage cell 410 to define the shared coverage area 406; that is, if the UAV 102 is located in the shared coverage area 406, its RFID sensor 110 could detect pilot signals broadcasted by both beacon 1 and beacon 2. The size or number of shared coverage areas are a matter of design choice; however, having at least one shared coverage area within each coverage cell can enhance the UAV's ability to locate the next beacon in its flight plan.

If the UAV 102 is located in an area of a coverage cell that is not a shared coverage area, the UAV 102 may automatically navigate to other locations until it is able to detect the pilot signal from the beacon it should next visit. In these situations, the UAV 102 can be configured to navigate in a predefined direction (e.g., the UAV 102 can rely on navigational hints that have been preloaded onto the UAV 102) or can fly at random until the appropriate pilot signal is detected. In some examples, the navigational hints can include a predetermined direction that the UAV 102 should fly in if a signal is lost (e.g., toward the base station 104, toward the last-visited beacon, etc.).

The data center 401 also includes the base station 104. After the UAV 102 has surveyed the environmental conditions of the data center 401, the UAV 102 can return to the base station 104 to recharge its battery 109. The UAV 102 can also be recalled to the base station 104 upon the occurrence of an event. For example, if the UAV 102 or the base station 104 detects that the battery 109 is running out of energy while the UAV 102 is deployed, the UAV 102 can return to the base station 104, even if the UAV 102 has not finished monitoring the data center 401.

In some examples, the UAV 102 may use additional techniques to navigate within the monitored environment. For example, in some situations, RFID-based navigation may not provide a high enough level of accuracy, and greater precision may be desired. To increase the level of precision with which the UAV 102 can navigate (e.g., to beacons and to its base station), the UAV 102 may further include one or more infrared (IR) receivers for receiving IR signals from one or more beacons and base stations within the monitored environment. For example, beacons or base stations may include respective IR transmitters that provide an IR signal encoded to a predetermined frequency (e.g., a frequency that will avoid interference with other light sources within the monitored environment, such as ceiling lights and lights on the monitored electronic equipment). In some examples, depending on the equipment, IR transmitters and receivers can be used to guide the UAV 102 with a greater degree of precision than an RFID-based navigation system.

The UAV 102 may use IR equipment in combination with the RFID-based navigation system discussed above to efficiently and accurately navigate between various points within a monitored environment. For example, the UAV 102 may acquire the RFID signal broadcast by a beacon from a relatively long distance, and may navigate toward that beacon using the RFID signal. In some examples, once the UAV 102 has arrived within a threshold distance of the beacon, has obtained a line-of-sight with the IR signal source on the beacon, or is otherwise able to detect an IR signal being transmitted by the beacon, the UAV 102 may use the IR signal generated by the beacon to fine-tune its navigation. For example, the UAV may use an RFID signal to navigate to within five feet of a beacon, and may then acquire and use an IR signal generated by the beacon in order to move into a position directly above the beacon (e.g., a position that is within six inches of a desired position). The level of accuracy in the navigation of the UAV 102 can depend on adjustable tolerances for position sensing, and may also depend on the quality of the navigational equipment used by the UAV 102, the beacons, the base station, and any other monitoring equipment.

In some examples, the UAV 102 can also use one or more cameras (e.g., the horizon camera 130 (FIG. 1)) to obtain further information about the surrounding environment. For example, the UAV 102 can use the horizon camera 130 or one or more additional cameras to provide visual feedback of the monitored environment. The visual feedback can include the collection and storage of videos, images, or a combination thereof. For example, the UAV 102 can be configured to use one or more cameras to capture video or images of monitored equipment that has been determined to be problematic. The UAV 102 can begin capturing visual data upon the detection of an abnormal environmental condition, upon receiving a control signal from a user (e.g., via a user interface that is in communication with the UAV 102), or may periodically capture visual data according to a predefined schedule (e.g., once per day). The additional visual data collected by the UAV 102 can be transmitted to the base station 104 to be analyzed by an operator, or can be automatically analyzed using one or more image recognition applications. For example, an image recognition application may examine an image of a machine in a datacenter to determine whether one or more warning lights have been activated on the machine. In some examples, the image recognition application may compare the received visual information to images or videos of the subject of the visual information operating in a normal state. Upon the detection of an anomaly by the image recognition software, a notification (e.g., an alert or alarm) can be generated. In some examples, the image recognition software can be implemented on the UAV 102 to facilitate the real-time monitoring of visual data.

Figure 5:
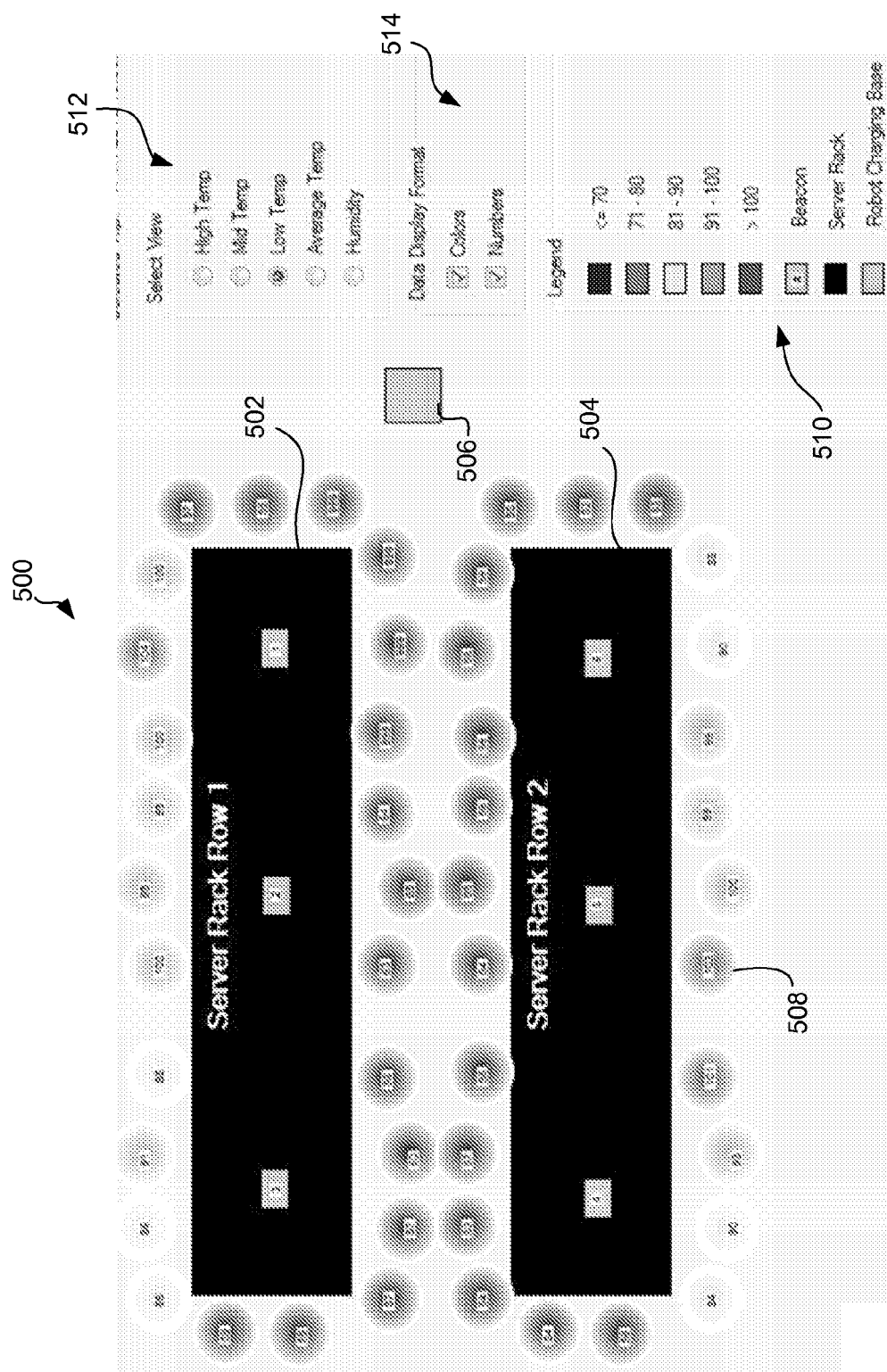
FIG. 5 is a diagram of user interface that displays captured environmental information.

FIG. 5 shows an example of a user interface 500 for interacting with the data captured by the UAV 102. In some examples, the user interface 500 can be an environmental map of a data center that contains a first server rack row 502 and a second server rack row 504; that is, the user interface 500 can be a visual representation of monitored environment. The user interface 500 can include a number of tools, graphics, and other features that allow users to monitor the environmental conditions of a given location.

In this example, the user interface 500 presents a number of environmental graphics, such as temperature graphic 508, which graphically represent the temperature of a monitored point (or group of points) within the monitored environment. The user interface 500 includes controls, such as view control 512 and detail control 514, that allow a user to specify which information the environmental graphics will be associated with. For example, as the view control 512 specifies that a "low temp" will be used and detail control 514 specifies that both colors and numbers will be used, the environmental graphics represent the temperature recorded at the "low altitude" (e.g., the lowest of three measured altitudes) for one or more monitored locations represented by each environmental graphic, and the environmental graphics are both color-coded according to a legend 510 and display a numerical temperature. For example, the temperature graphic 508 indicates that the temperature recorded at the low location was 103 degrees, which is demonstrated by the numerical value within the temperature graphic 508. Furthermore, the temperature graphic 508 is colored red which, according to the legend 510, indicates that the temperature of the location associated with the temperature graphic 508 is over 100 degrees. The user interface 500 may also include a graphical representation of a base station 506, as well as graphical representations that show the locations of one or more beacons within the monitored environment (e.g., beacons 1, 2, 3, 4, 5, and 6).

The view control 512 can be manipulated to cause the user interface 500 to display various types of information. For example, activating the view control 512 can cause the user interface 500 to display a high temperature (e.g., the temperature measured at the "high" location), a middle temperature (e.g., the temperature measured at the "middle" location) to show thermal layers based on altitude within the environment, and/or the measured humidity. The user interface 500 can also be configured to display alerts that are related to the monitored environment. For example, if the temperature for a given location is measured to be above a threshold value, an alarm can be triggered (e.g., an audible alarm, and/or an email alert or other notification). Furthermore, certain conditions may trigger responsive actions, such as the shutdown of a machine or group of machines that are operating in a region associated with an unfavorable environmental condition (e.g., high heat and/or high humidity).

Figure 6:
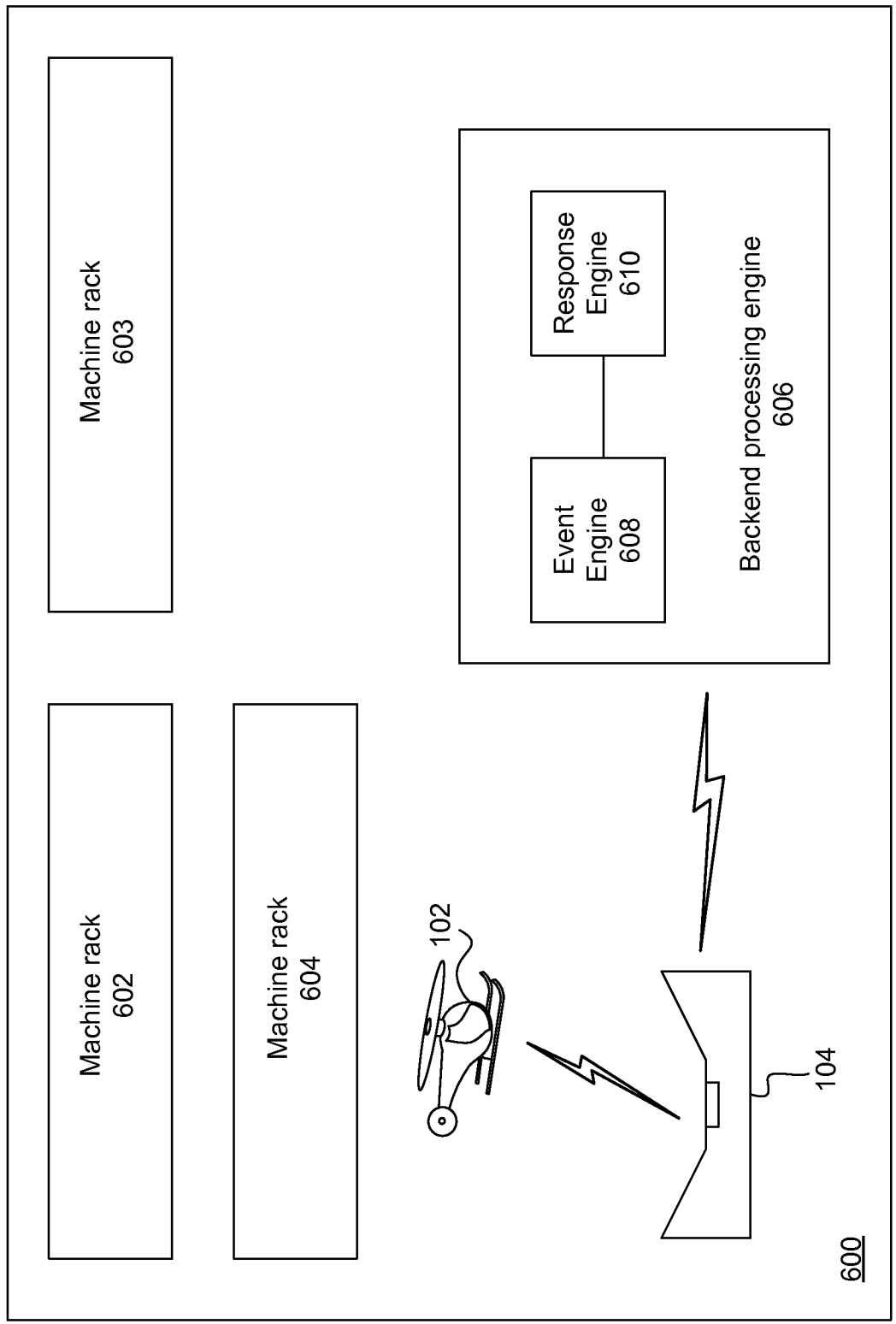
FIGS. 6-10 are diagrams of data centers.

FIG. 6 shows an example data center 600 that includes machine racks 602-604, the UAV 102, the base station 104, and a backend processing engine 606. While in this example (and in some examples that follow) the backend processing engine 606 is shown as being located within the data center 600, the backend processing engine 606 can also be located outside the data center 600. For example, the backend processing engine 606 (or one or more additional backend processing engines) may be located remotely relative to the data center 600, and may communicate with, for example, the base station 104 over a network (e.g., the Internet). In some examples, some or all of the functions of the backend processing engine 606 can be provided by the base station 104, the UAV 102, or some combination thereof. In some examples, the UAV 102 can communicate directly with the backend processing engine 606.

In general, the backend processing engine 606 uses data collected by the UAV 102 to monitor conditions of, and effect changes in, the data center 606. The backend processing engine 606 may also use data collected by the UAV 102 to generate reports, or visualizations of the conditions within the data center 600. In some examples, the backend processing engine 606 includes an event engine 608 and a response engine 610. The event engine 608 can receive data (e.g., reports provided by the UAV 102) and can analyze the received data to determine whether one or more events have occurred. The event engine 608 can detect and identify a variety of events, examples of which will be described if greater detail below. Based on detecting one or more events, the event engine 608 can provide an indication that an event has occurred to the response engine 610. The response engine 610 may take one or more predefined actions based on the manner of event identified by the event engine 608. As a simplified example, if the event engine 608 determines that the data center 600 is too warm (e.g., if the temperature of the data center 600 detected by the UAV 102 exceeds a threshold temperature) and sends an event notification to the response engine 610, the response engine 610 could take an action to, for example, provide additional cooling to one or more portions of the data center 600. In some examples, the response engine 10 comprises one or more response rules that can be applied to event notifications received from the event engine.

Figure 7:
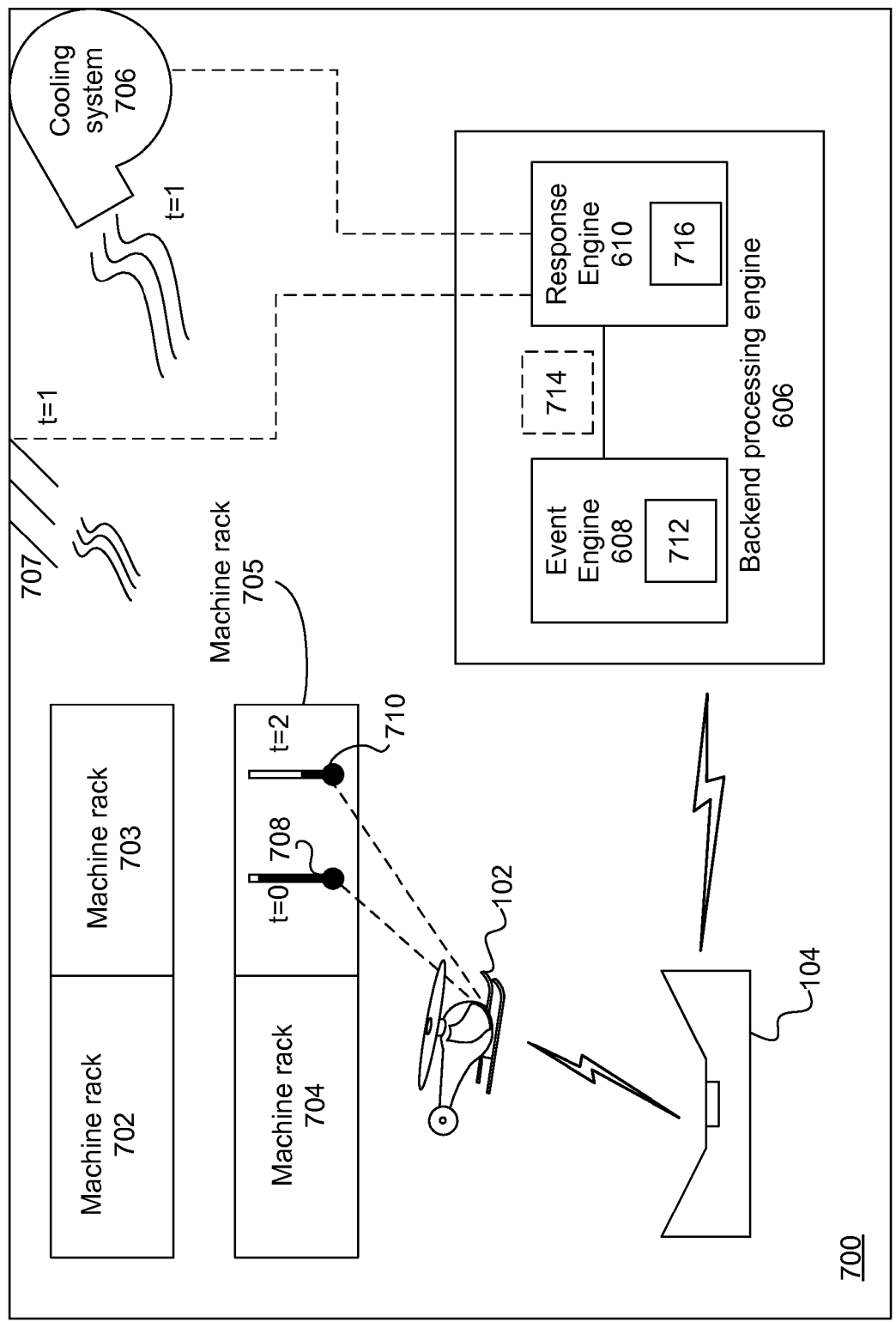

FIG. 7 shows a data center 700 that includes machine racks 702-705, the UAV 102, the base station 104, and the backend processing engine 606. In this example, the UAV 102 collects environmental information (e.g., temperature data) within the data center 700. The UAV 102 may collect the environmental information using, for example, the collection and monitoring techniques described above. FIG. 7 shows an example of how the backend processing engine 606 may use data collected by the UAV 102 to monitor conditions within the data center 700, and further shows a possible corrective response that can be executed based on the collected data.

As the UAV collects environmental information within the data center 700, the UAV 102 may detect specific temperatures near the machine racks 702-705. For example, at t=0, the UAV 102 may collect environmental information that includes a first temperature 708 associated with the machine rack 705. After recording the first temperature 708 of the machine rack 705, the UAV 102 may provide a report to the base station 104 that includes the first temperature 708. The report may include information other than the first temperature 708. For example, the report may include data that associates the first temperature 708 with the machine rack 705 (e.g., location information) as well as other environmental information (e.g., other temperature measurements of the machine rack 705 or other machine racks, humidity data, etc).

The base station 104 collects the report that includes the first temperature 708 from the UAV 102 and provides the first temperature 708 to the backend processing engine 606. The base station 104 may provide information to the backend processing engine 606 as the information is received at the base station 104, or may provide information to the backend processing engine 606 in batches (e.g., after the base station 104 receives a predetermined amount of data or reports). The event engine 608 of the backend processing engine 606 can analyze the information provided by the base station 104 (including the first temperature 708) to determine whether an event has occurred. For example, the backend processing engine 606 may analyze the first temperature 708 and, as a result, may determine that the first temperature 708 exceeds a threshold temperature 712. The threshold temperature 712 may be associated with the data center 700 as a whole, or may be associated with a specific area of the data center 700 (e.g., an area in the vicinity of the machine rack 705). If the first temperature 708 exceeds the threshold temperature 712, the event engine 608 may determine that an event has occurred, and may provide an event notification 715 to the response engine 610.

After receiving the event notification 715, the response engine 710 may execute one or more predetermined responses 716. For example, the response engine 610 may determine that because the first temperature 708 exceeds the threshold temperature 712 (e.g., by a predetermined margin), the predetermine response 716 should be executed to lower the first temperature 708. In some examples, the one or more predetermined responses 716 include a response that causes the backend processing engine 606 to activate a cooling system 706 associated with the data center 600. In the example of FIG. 7, the backend processing engine 606 has activated the cooling system 706 at t=1 in order to lower the temperature of the data center 700 (or a portion thereof, such as an area associated with the machine rack 705). In some examples, activating the cooling system 706 includes altering one or more data center chillers (e.g., by altering an air temperature level, a fan speed, or other setting of the chiller). While some data center chillers include temperature sensors disposed on or near the chiller itself, allowing the UAV 102 to act as a remote temperature sensor can increase the efficiency of the cooling system 706 by allowing customized temperature readings to replace or supplement the chiller's on-board sensor. In this way, the cooling system 706 can begin reducing a temperature of the data center 700 even if the area of high temperature is located relatively far from the chiller's onboard temperature sensor, which might otherwise delay the activation of the cooling system 706.

Still referring to FIG. 7, the one or more predetermined responses 716 may include a response that causes the backend processing engine 606 to adjust adjustment an air duct 707 within the data center 700 provide additional cooling to the area associated with the first temperature 708. For example, at t=1, the response engine 610 may adjust one or more vents to direct cooling air toward the machine rack 705. The air duct 707 may be associated with the cooling system 706, or may be a standalone aspect of a cooling solution of the data center 700.

After the response engine 610 has executed one or more of the predetermined responses 716 (also referred to as corrective actions), the UAV 102 can be dispatched to the location associated with the first temperature 708 to gather additional environmental information (e.g., to determine the effectiveness of any of the predetermined responses 716 that were executed). For example, at t=2, the backend processing engine 606 can dispatch the UAV 102 to the machine rack 705 to take additional temperature readings. In this example, the UAV 102 has determined that the area near the machine rack 705 has dropped to a second temperature 710. The UAV 102 may report the second temperature 710 to the backend processing engine 606, and similar evaluations can be performed to determine whether any events have occurred (e.g., whether the second temperature exceeds the threshold temperature 714) and/or whether additional corrective actions should be executed.

Figure 8:
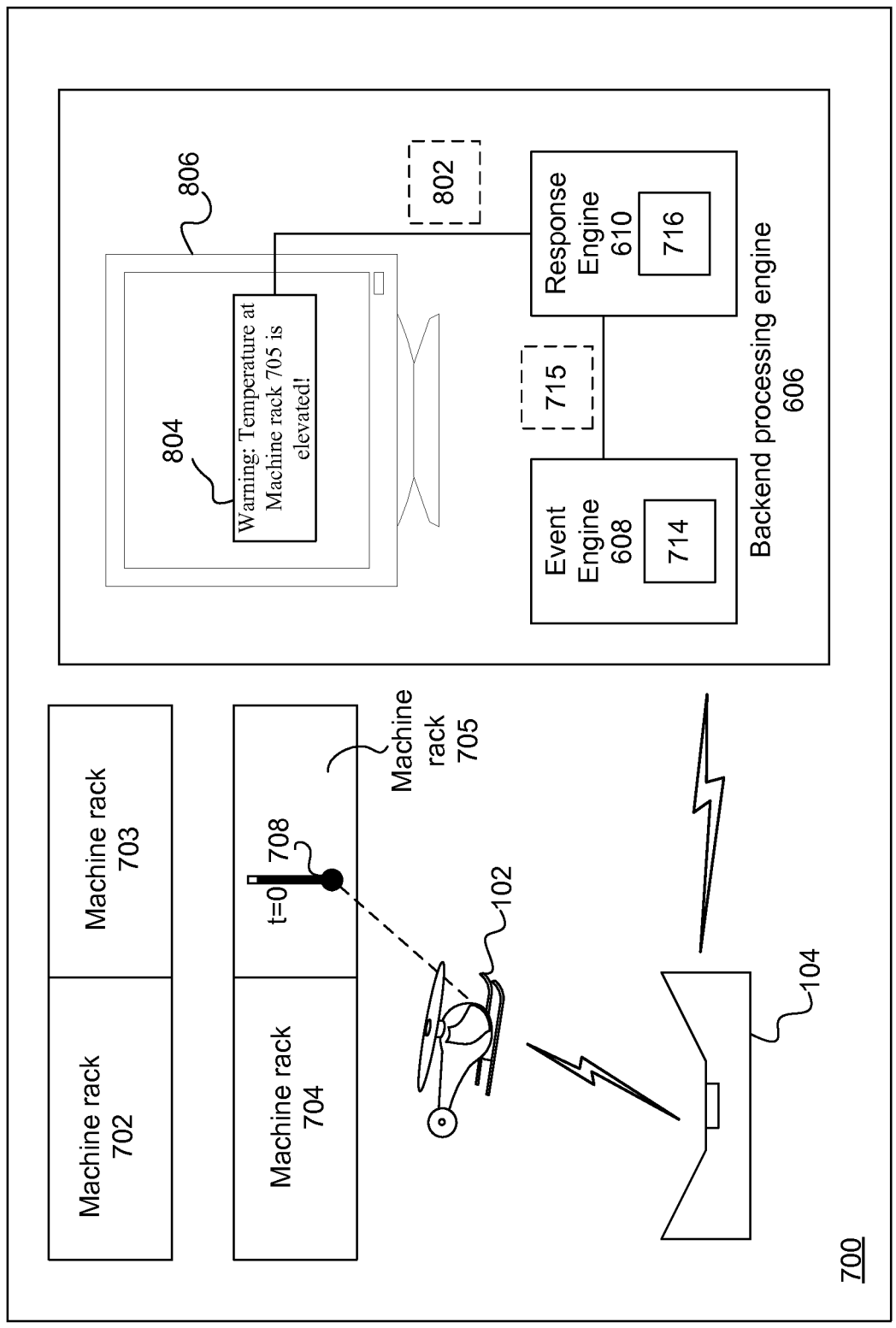

FIG. 8 shows an example predetermined response 716 that can be executed by the response engine 710. In this example, after receiving the event notification 715, the response engine 610 can execute one of the predetermined responses 716 to provide a notification 802. In some examples, providing the notification 802 can include providing a visual alert 804 on a display 806 associated with the backend processing engine 606. The notification 802 can also be provided as an audible alarm. In some examples, alerts such as the visual alert 804 can be configured to notify an operator of the backend processing engine 606 of the occurrence of an event. In this example, the visual alert 804 includes a warning related to the elevated temperature near machine rack 705. The notification may also provide one or more suggested corrective actions that can be selected by an operator to address the event identified by the event notification 715. For example, the suggested corrective actions may allow an operator to activate the cooling system 706 or adjust the vents of the air duct 707.

Figure 9:
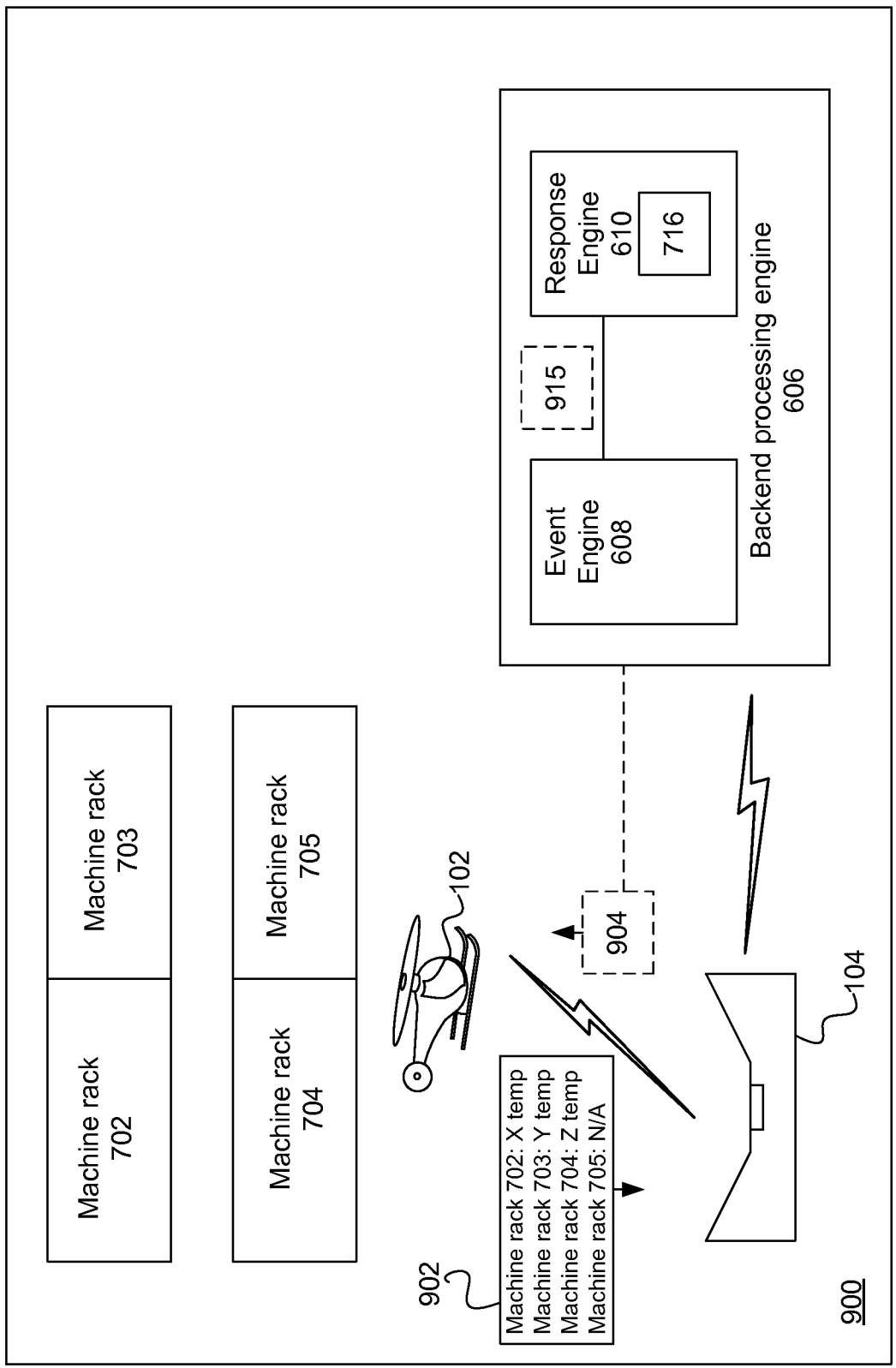

FIG. 9 shows a data center 900 that includes the machine racks 702-705, the UAV 102, the base station 104, and the backend processing engine 606. In this example, the UAV has collected environmental information within the data center 900 and has generated a report 902 that indicates the temperature detected near each of the machine racks 702-704. The report 902 further indicates that the temperature near the machine rack 705 is not available.

After receiving the report 902 (e.g., via the base station 104), the backend processing engine 606 can determine whether an event has occurred using the event engine 608. In this example, the event engine 608 determines that an event has occurred based on the absence of temperature data for machine rack 705 in the report 902. In some examples, the event engine 608 may determine whether the area associated with the missing environmental information is large enough to warrant a corrective action. For example, the event engine 608 may compare a size of the area associated with the missing environmental information to a threshold size (e.g., 25 square feet) and, if the area exceeds the threshold size, an event notification can be generated.

The event engine 608 provides an event notification 915 to the response engine 610 that indicates the type of event that has occurred. Based on receiving the event notification 915, the response engine 610 executes one of the predetermined responses 716. In this example, the response engine 610 may execute a predetermined response that causes updated monitoring instructions 904 to be provided to the UAV 102 which, in turn, may cause the UAV to return to the machine rack 905 to attempt to collect the missing environmental information. In some examples, the updated monitoring instructions 904 include instructions to direct the UAV 102 to the nearest RFID beacon, and may also include relative vectors from the beacon to the missed area. In the event the UAV 102 is unable to reach the missed area (e.g., due to the presence of equipment or an obstacle), the backend processing engine 606 may mark (or may allow an operator to mark) the area as unreachable so that additional monitoring passes are not triggered.

Figure 10:
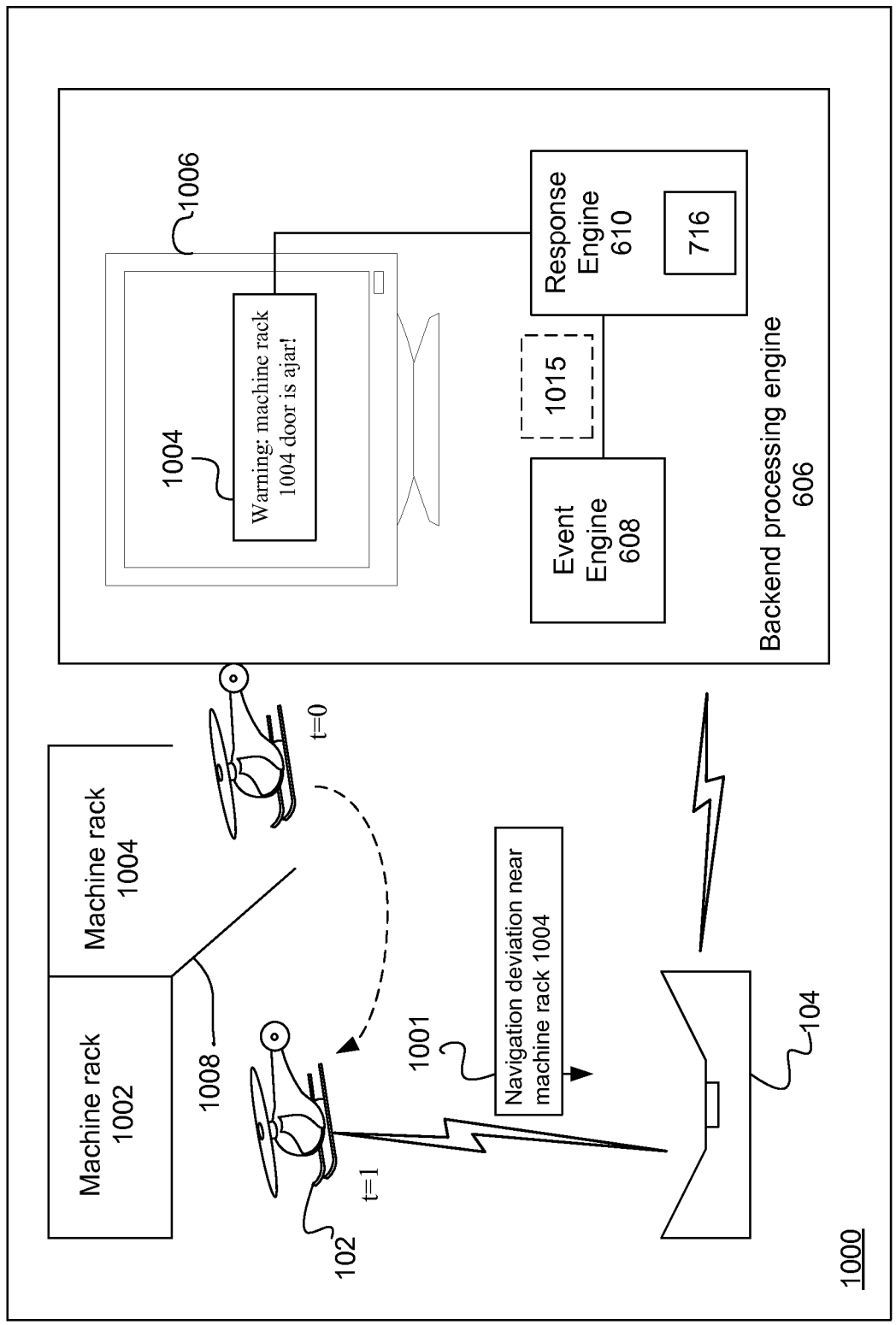

FIG. 10 shows a data center 1000 that includes machine racks 1002 and 1004, the UAV 102, the base station 104, and the backend processing engine 606. The backend processing engine 606 includes a display 1006. In this example, the UAV 102 has encountered a navigation deviation near the machine rack 1004 due to the open cabinet door 1008 of the machine rack 1004. For example, the UAV 102 may have used its onboard sensors to detect an obstacle (the cabinet door 1008) in its flight path (e.g., a default flight path) while traveling during the interval identified by t=0 and t=1. As a result, the UAV 102 provides a report 1001 to the backend processing engine 606 (e.g., via the base station 104) that identifies the navigation deviation and the location of the UAV 102 when the navigation deviation was encountered.

In some examples, the event engine 606 analyzes the report 1001 to determine that an event has occurred (e.g., to determine that the cabinet door 1008 is ajar). Based on determining that an event has occurred, the event engine 608 provides an event notification 1015 to the response engine 610. The response engine 610 uses the event notification 1015 to select one or more of the predetermined responses 716 to execute to correct the problem that triggered the event notification 1015. In this example, the response engine 610 causes a notification 1004 to be displayed on the display 1006 associated with the backend processing engine 606. The notification 1004 warns an operator that the cabinet door 1008 has been left ajar. The notification 1004 could also be in the form of a pop-up window, an automated email, an SMS text message, or an audible alert. Cabinet doors, such as the cabinet door 1008, can provide a level of physical security within the data center 1000. This is especially important in multi-tenant and high-security data center environments. As a result, keeping the cabinet door 1008 closed can also help promote effective security, and may also improve an airflow within the data center 100.

Other events may also trigger one or more predetermined responses. For example, the techniques described above can be used to address both real and simulated cooling system failures within a data center. In some examples, in the event of a single cooling device outage, other cooling devices can operate at a higher capacity to provide the necessary coverage (e.g., to maintain appropriate temperature/humidity levels). The UAV 102 and the back end processing provided by the backend processing engine 606 can be used to efficiently calibrate the cooling systems within a data center to maintain desired temperature levels. For example, upon detecting that a cooling device has failed (e.g., as a result of the UAV 102 determining that areas near chilling vents or ducts are exceed a threshold temperature), a response engine may automatically adjust other cooling devices within the data center to operate at a higher capacity. After the other cooling devices have been adjusted, the UAV 102 may continue to monitor the environmental conditions within the data center to assess both the effects of the failed cooling device and the results of the adjusted devices. The backend processing engine 606 may cause the UAV 102 to perform additional or modified monitoring passes to increase the frequency of data capture associated with the floor space near the failed cooling device. After the failed cooling device is restored, the backend processing engine 606 can automatically return the settings of all the adjusted cooling devices back to normal levels, and may confirm that the temperatures within the data center stay within expected ranges.

In some examples, cooling devices may be associated with application program interfaces (APIs) that support input from external sources using various protocols. Similarly, older cooling devices that do not have a published interface or network connectivity can be retrofitted with analog interfaces in the form of, for example, a microcontroller platform with a network interface which provides these APIs (e.g., an Arduino-based device). In the event a particular cooling device is unavailable, other cooling devices' thermostats can be set to a lower temperature to compensate for the unavailable cooling device.

Cooling system failures such as that described above can also be simulated using the UAV 102 and its associated back end processing. For example, simulated cooling system failures can be created by disabling one or more cooling devices at a time and measuring the impact of the device's failure on the data center. After the results of the simulated failures are captured, a failure response plan can be generated that specifies adjustments for other cooling devices that should be implemented if a given cooling device fails. As a result, in the event of an actual cooling system failure, the response engine could simply execute the stored failure response plan to adjust the remaining active cooling devices. The failure response plan may include various options. For example, the failure response plan may allow the backend processing engine 606 or an operator to select from varying response levels in the event of a device failure (e.g., maximum cooling, minimum cooling, or minimum power use). In some examples, to simulate a cooling device failure, a thermostat can be adjusted to a high temperature (e.g., to prevent its fan from providing cooling air). A thermostat can then be adjusted to a lower temperature to activate its fans. After a predetermined amount of time (e.g., a few minutes_, the UAV 102 can be launched to observe the temperature pattern and to determine the impact of the simulated cooling device failure and response.

In some examples, the backend processing engine 606 can be configured to perform historical analysis of the environmental information collected by the UAV 102. The backend processing engine 606 can use a historical record of the collected environmental information to optimize conditions within a data center. For example, the backend processing engine 606 may accumulate a batch of environmental information for a predetermined length of time (e.g., thirty days), and may then evaluate the batch to provide optimization recommendations. In some examples, the backend processing engine 606 may use historical environmental information to identify areas within a data center in which temperatures or humidity levels are consistently above or below desired levels. As a result, the backend processing engine 606 may recommend options for relocating equipment (e.g., machine racks) within the data center to correct the areas of concern. For example, if a temperature is consistently high in one area in a rack over an extended period of time, a recommendation can be provided to an administrator that some of the equipment should be moved to another rack, turned off, or adjusted to potentially lower the temperature of the identified area. The backend processing engine 606 may also provide an indication that a mechanical failure has possibly occurred (e.g., that a fan in a device is disabled and/or not configured properly).

In some examples, the backend processing engine 606 may determine, based on the low, medium, and high altitude passes discussed above, a particular region of a machine rack that stores to determine where within the machine rack the offending equipment, or areas of machine racks that have available capacity (e.g., empty machine slots within a machine rack). Additionally, the results of the historical analysis can be used to identify opportunities to adjust air ducts or cooling system vents direct to more efficiently direct cooling air and to more effectively exhaust warm air from the data center.

While some of the examples above refer to the UAV 102 as the environmental information collection device, other collection devices could be used in combination with the collection and back end processing techniques described above. For example, instead of, or in addition to, the UAV 102, other land, air, or aquatic vehicles could be used to collect the environmental information. Similar collection and back end processing techniques can also be used in combination with data collected by sensors that are not part of a vehicle (e.g., stationary sensors, such as sensors that are integral to a data center or a machine rack).

Figure 11:
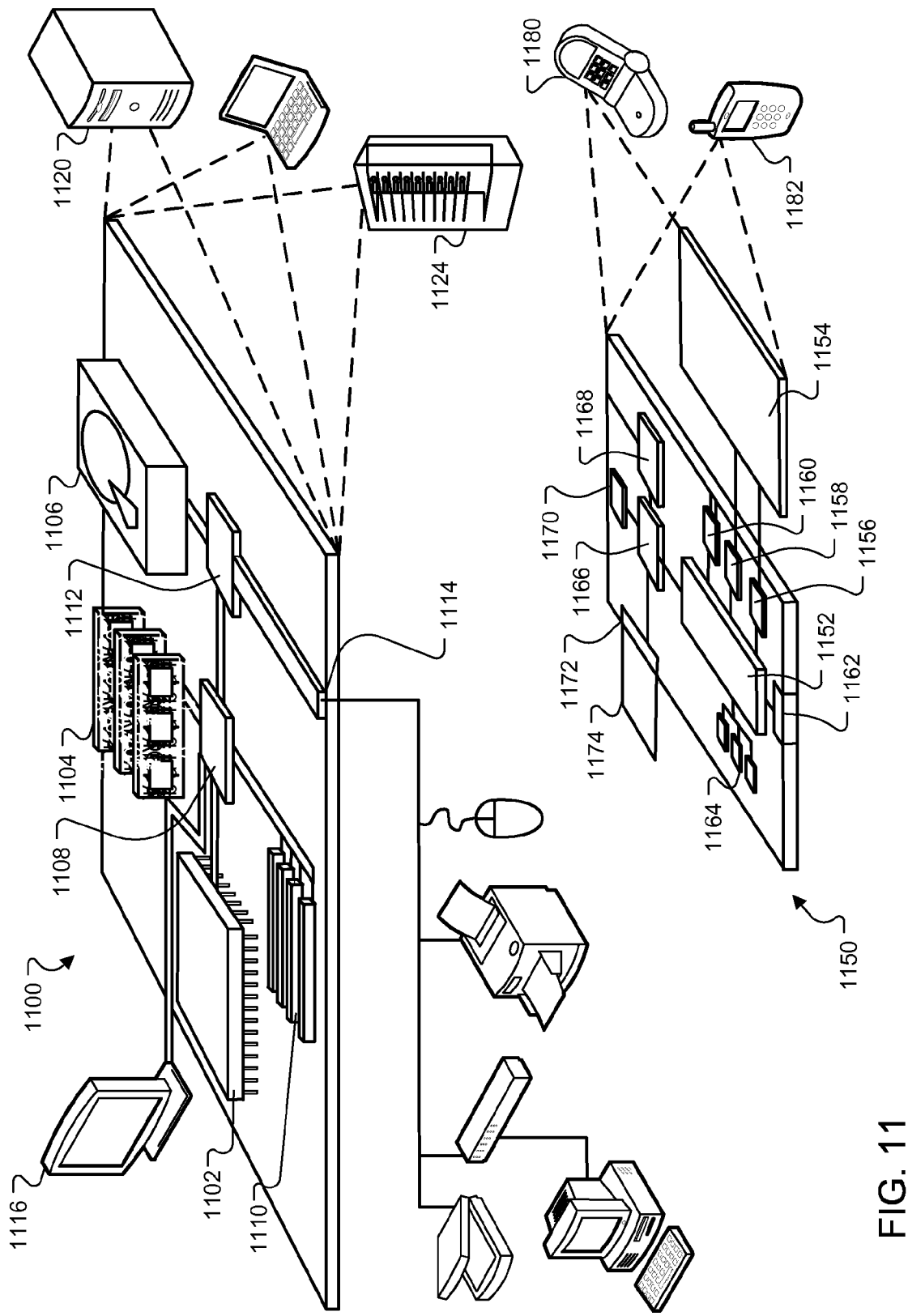
FIG. 11 is a diagram of a computing system.

FIG. 11 shows an example of a computing device 1100 and a mobile computing device 1150 that can be used to implement the techniques described in this disclosure. The computing device 1100 is intended to represent various forms of digital computers, such as laptops, desktops, workstations, personal digital assistants, servers, blade servers, mainframes, and other appropriate computers. The mobile computing device 1150 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 may also be another form of computer-readable medium, such as a magnetic or optical disk.

The storage device 1106 is capable of providing mass storage for the computing device 1100. In some implementations, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1102), perform one or more methods, such as those described above. The instructions can also be stored by one or more storage devices such as computer- or machine-readable mediums (for example, the memory 1104, the storage device 1106, or memory on the processor 1102).

The high-speed interface 1108 manages bandwidth-intensive operations for the computing device 1100, while the low-speed interface 1112 manages lower bandwidth-intensive operations. Such allocation of functions is an example only. In some implementations, the high-speed interface 1108 is coupled to the memory 1104, the display 1116 (e.g., through a graphics processor or accelerator), and to the high-speed expansion ports 1110, which may accept various expansion cards (not shown). In the implementation, the low-speed interface 1112 is coupled to the storage device 1106 and the low-speed expansion port 1114. The low-speed expansion port 1114, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. In addition, it may be implemented in a personal computer such as a laptop computer 1122. It may also be implemented as part of a rack server system 1124. Alternatively, components from the computing device 1100 may be combined with other components in a mobile device (not shown), such as a mobile computing device 1150. Each of such devices may contain one or more of the computing device 1100 and the mobile computing device 1150, and an entire system may be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 may also be provided with a storage device, such as a micro-drive or other device, to provide additional storage. Each of the processor 1152, the memory 1164, the display 1154, the communication interface 1166, and the transceiver 1168, are interconnected using various buses, and several of the components may be mounted on a common motherboard or in other manners as appropriate.

The processor 1152 can execute instructions within the mobile computing device 1150, including instructions stored in the memory 1164. The processor 1152 may be implemented as a chipset of chips that include separate and multiple analog and digital processors. The processor 1152 may provide, for example, for coordination of the other components of the mobile computing device 1150, such as control of user interfaces, applications run by the mobile computing device 1150, and wireless communication by the mobile computing device 1150.

The processor 1152 may communicate with a user through a control interface 1158 and a display interface 1156 coupled to the display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may provide communication with the processor 1152, so as to enable near area communication of the mobile computing device 1150 with other devices. The external interface 1162 may provide, for example, for wired communication in some implementations, or for wireless communication in other implementations, and multiple interfaces may also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 may also be provided and connected to the mobile computing device 1150 through an expansion interface 1172, which may include, for example, a SIMM (Single In Line Memory Module) card interface. The expansion memory 1174 may provide extra storage space for the mobile computing device 1150, or may also store applications or other information for the mobile computing device 1150. Specifically, the expansion memory 1174 may include instructions to carry out or supplement the processes described above, and may include secure information also. Thus, for example, the expansion memory 1174 may be provide as a security module for the mobile computing device 1150, and may be programmed with instructions that permit secure use of the mobile computing device 1150. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 1152), perform one or more methods, such as those described above. The instructions can also be stored by one or more storage devices, such as one or more computer- or machine-readable mediums (for example, the memory 1164, the expansion memory 1174, or memory on the processor 1152). In some implementations, the instructions can be received in a propagated signal, for example, over the transceiver 1168 or the external interface 1162.

The mobile computing device 1150 may communicate wirelessly through the communication interface 1166, which may include digital signal processing circuitry where necessary. The communication interface 1166 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1168 using a radio-frequency. In addition, short-range communication may occur, such as using a Bluetooth, WiFi, or other such transceiver (not shown). In addition, a GPS (Global Positioning System) receiver module 1170 may provide additional navigation- and location-related wireless data to the mobile computing device 1150, which may be used as appropriate by applications running on the mobile computing device 1150.

The mobile computing device 1150 may also communicate audibly using an audio codec 1160, which may receive spoken information from a user and convert it to usable digital information. The audio codec 1160 may likewise generate audible sound for a user, such as through a speaker, e.g., in a handset of the mobile computing device 1150. Such sound may include sound from voice telephone calls, may include recorded sound (e.g., voice messages, music files, etc.) and may also include sound generated by applications operating on the mobile computing device 1150.

The mobile computing device 1150 may be implemented in a number of different forms, as shown in the figure. For example, it may be implemented as a cellular telephone 1180. It may also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method performed on a vehicle, the method comprising:
    detecting a pilot signal associated with a beacon located inside an indoor data center;
    navigating, based on a predetermined flight path, towards the beacon;
    determining, based on the pilot signal, that the vehicle is located within a predetermined range of the beacon, the beacon being associated with a beacon identification;
    conducting a monitoring pass based on determining that the vehicle is located within a predetermined range of the beacon, wherein conducting the monitoring pass comprises navigating the vehicle to a first location based on determining that the vehicle is located within the predetermined range;
    determining that the vehicle is located at the first location;
    generating a first report based on determining that the vehicle is located at the first location, the generating comprising:
        specifying the beacon identification;
        recording navigation data that comprises an altitude, a distance from the beacon, and a bearing relative to the beacon; and
        recording environmental data comprising one or more of a temperature or a level of humidity of the first location; and
    transmitting the first report from the vehicle to a base station, the first report comprising the beacon identification, the navigation data, and the environmental data.

2. The method of claim 1, wherein navigating the vehicle to the first location comprises navigating the vehicle according to a predetermined pattern of movement.

3. The method of claim 1, wherein navigating the vehicle to the first location comprises avoiding obstacles based on data provided by one or more obstacle sensors associated with the vehicle.

4. The method of claim 3, wherein the one or more obstacle sensors comprise one or more of an ultrasonic sensor, an infrared sensor, a camera, an altimeter, and one or more contact switches.

5. The method of claim 1,
    wherein the beacon broadcasts the beacon identification;
    the method further comprising receiving the beacon identification broadcast by the beacon.

6. The method of claim 1, further comprising navigating the vehicle to one or more subsequent locations and generating respective reports for the subsequent locations.

7. The method of claim 1, wherein conducting the monitoring pass further comprises activating one or more sensors.

8. The method of claim 7, wherein the one or more sensors comprise one or more of an altimeter, a compass, a temperature sensor, a humidity sensor, and a radio-frequency identification (RFID) sensor.

9. The method of claim 1, wherein the vehicle comprises a rotary wing aerial vehicle.

10. The method of claim 9, wherein the vehicle comprises a quad-rotor aerial vehicle.

11. The method of claim 1, wherein the vehicle is unmanned aerial vehicle (UAV).

12. The method of claim 1, further comprising determining environmental qualities of one or more locations within a data center based at least in part on the first report.

13. The method of claim 1, further comprising:
    generating an initial report based on determining that the vehicle is located within a predetermined range of the beacon; and
    transmitting the initial report from the vehicle to a base station prior to navigating the vehicle to the first location;
    wherein the initial report comprises the beacon identification, initial navigation data, and initial environmental data.

14. The method of claim 13, wherein generating the initial report comprises:
    specifying the beacon identification;
    recording the initial navigation data that comprises an initial altitude, an initial distance from the beacon, and an initial bearing relative to the beacon; and
    recording the initial environmental data.

15. The method of claim 1, further comprising capturing visual data using one or more cameras associated with the vehicle.

16. The method of claim 15, wherein the visual data comprises one or more of an image or a video.

17. The method of claim 15, further comprising capturing the visual data based on a determination that one or more events has occurred.

18. The method of claim 17, wherein the determination comprises determining that at least a portion of the environmental data satisfies a predetermined threshold.

19. The method of claim 2, wherein the predetermined pattern of movement comprises a spiral pattern of movement at a fixed altitude above ground level or a spiral pattern of movement with a descending altitude above ground level.

20. A method performed on a vehicle, the method comprising:
   detecting a pilot signal associated with a beacon located inside an indoor data center;
   navigating, based on a predetermined flight path, towards the beacon;
   determining, based on the pilot signal, that the vehicle is located within a predetermined range of the beacon, the beacon being associated with a beacon identification;
   generating an initial report based on determining that the vehicle is located within a predetermined range of the beacon, the generating comprising:
      specifying the beacon identification;
      recording navigation data that comprises an altitude, a distance from the beacon, and a bearing relative to the beacon; and
      recording environmental data;
   transmitting the initial report from the vehicle to a base station, the initial report comprising the beacon identification, the navigation data, and the environmental data; and
   conducting a monitoring pass based on determining that the vehicle is located within a predetermined range of the beacon, wherein conducting the monitoring pass comprises navigating the vehicle to a first location.

21. A method performed on a vehicle, the method comprising:
   detecting a pilot signal associated with a beacon located inside an indoor data center;
   navigating, based on a predetermined flight path, towards the beacon;
   determining, based on the pilot signal, that the vehicle is located within a predetermined range of the beacon, the beacon being associated with a beacon identification;
   conducting a monitoring pass based on determining that the vehicle is located within a predetermined range of the beacon, wherein conducting the monitoring pass comprises navigating the vehicle to a first location based on determining that the vehicle is located within the predetermined range;
   determining that the vehicle is located at the first location; and
   generating a first report based on determining that the vehicle is located at the first location, the first report comprising the beacon identification, navigation data that comprises an altitude, a distance from the beacon, and a bearing relative to the beacon, and environmental data, wherein the environmental data comprises measurements of one or more of a temperature or a level of humidity of the first location.

22. A method performed on a vehicle, the method comprising:
   receiving a first signal associated with a first protocol;
   navigating a vehicle toward a beacon based on the first signal and a predetermined flight path, the beacon being associated with a beacon identification;
   receiving a second signal associated with a second protocol;
   navigating the vehicle toward a first location based at least in part on the second signal;
   determining that the vehicle is located within a predetermined range of the first location based on the second signal; and
   generating a first report based on determining that the vehicle is located within the predetermined range, the first report comprising the beacon identification, navigation data that comprises an altitude, a distance from the beacon, and a bearing relative to the beacon, and environmental data.

23. A vehicle comprising:
   one or more first sensors configured to provide location information associated with a location of the vehicle;
   one or more second sensors configured to provide environmental data; and
   one or more memory devices and one or more processing devices in communication with the one or more first sensors and the one or more second sensors, the one or more memory devices and the one or more processing devices being configured to:
   detect a pilot signal associated with a beacon located inside an indoor data center;
   navigate, based on a predetermined flight path, towards the beacon;
   determine, based on the pilot signal, that the vehicle is located within a predetermined range of the beacon based on the location information, the beacon being associated with a beacon identification;
   conduct a monitoring pass based on determining that the vehicle is located within a predetermined range of the beacon, wherein conducting the monitoring pass comprises navigating the vehicle to a first location based on determining that the vehicle is located within the predetermined range; and
   generate, based on the environmental data, a first report based on determining that the vehicle is located at the first location, the first report comprising the beacon identification, navigation data that comprises an altitude, a distance from the beacon, and a bearing relative to the beacon, and the environmental data.

24. A computer storage device configured to store executable instructions that, when executed, cause one or more processing devices associated with a vehicle to perform operations comprising:
   detecting a pilot signal associated with a beacon located inside an indoor data center;
   navigating, based on a predetermined flight path, towards the beacon;
   determining, based on the pilot signal, that the vehicle is located within a predetermined range of the beacon, the beacon being associated with a beacon identification;
   conducting a monitoring pass based on determining that the vehicle is located within a predetermined range of the beacon, wherein conducting the monitoring pass comprises navigating the vehicle to a first location based on determining that the vehicle is located within the predetermined range;
   determining that the vehicle is located at the first location; and
   generating a first report based on determining that the vehicle is located at the first location, the first report comprising the beacon identification, navigation data that comprises an altitude, a distance from the beacon, and a bearing relative to the beacon, and environmental data.

* * * * *